(No Model.)

H. G. M. HOWARD & B. J. HEALY.
TWO WHEELED VEHICLE.

No. 409,588. Patented Aug. 20, 1889.

Witnesses:
Frank Hubbard
Edward Cope

Inventors.
Henry G. M. Howard
and
Byron J. Healy

UNITED STATES PATENT OFFICE.

HENRY G. M. HOWARD AND BYRON J. HEALY, OF KALAMAZOO, MICHIGAN.

TWO-WHEELED VEHICLE.

SPECIFICATION forming part of Letters Patent No. 409,588, dated August 20, 1889.

Application filed June 13, 1889. Serial No. 314,168. (No model.)

*To all whom it may concern:*

Be it known that we, HENRY G. M. HOWARD and BYRON J. HEALY, citizens of the United States, residing at Kalamazoo, county of Kalamazoo, and State of Michigan, have invented a new and useful Two-Wheeled Vehicle; and we declare the following to be a full, clear, and exact description of the invention, such as will enable others skilled in the art to which it appertains to make and use the same, reference being had to the accompanying drawings, and letters or figures of reference marked thereon, which form a part of this specification.

This invention consists in novel adoption and association of parts, substantially as below described and claimed.

The object of this invention is to provide a two-wheeled vehicle by a novel association of parts in such a way as to simplify the construction and make a cheaper cart than heretofore produced, and still have a strong, durable, and easy-riding vehicle.

Figure 1:
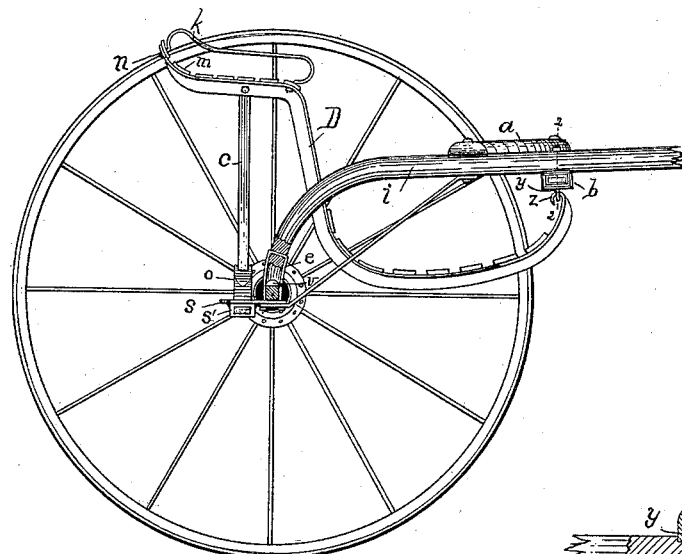
Figure 7:
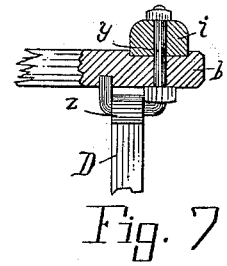
Figure 6:
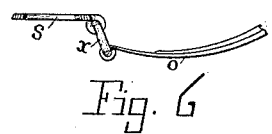
Figure 2:
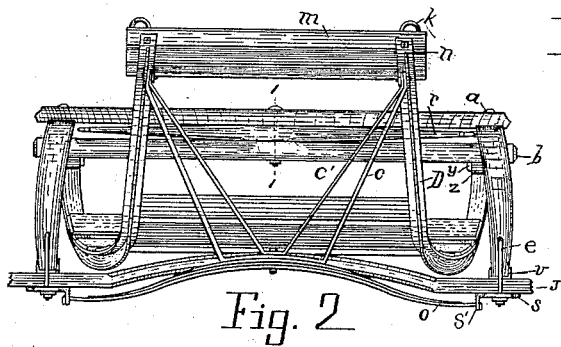
Figure 5:
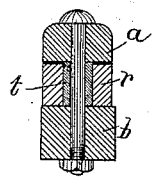
Figures 3, 4:
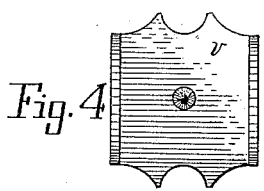

Figure 1 is a side view of our invention. Fig. 2 is a rear view of the same. Fig. 3 is a sectional view of center of cross-bar and whiffletree. Fig. 4 shows the shape of plate between the end of the thill and the axle. Fig. 5 is a detailed view of rod or clip used in connecting the thill with axle. Fig. 6 is a modification in connecting spring with step. Fig. 7 is a detailed view showing manner of connecting front end of body or bars to thill or cross-bars.

Referring to the drawings, A is the bent cross-bar connecting the thill-top, and B the straight cross-bar underneath the thill.

*r* is the whiffletree, located between the cross-bars at the center.

D is the bent side bars, forming with the cross-slats the body and seat of vehicle. The rear ends of bars are turned up to form the back of seat, and the front ends terminate in hooks, so they may be attached to staple on cross-bar or thills without removing bolts.

K is the end rail to seat, and is made in one piece for each side. The ends are turned down and pass through the slats and seat-bars.

C C are braces running at different angles to each other, but attached at the same point. This forms a strong support for the body to the spring O.

S is the step attached to axle on each side, and supporting the ends of spring in rear of axle by perforated lug on the inner side or by shackle attached to side of step.

*e* is the clip used in connecting the thill with the axle. It also passes through the step and thill-brace under the axle, connecting them all together.

*v* is the notched clip shown in Fig. 4, and is placed between thill and axle, the clip-rods resting in the notches, which, with the bed in the center, prevent the thill and step from getting out of place.

In Fig. 5 the rod E is shown before using, the last bend being made cold after passing through holes in thill.

The letter *r* in Fig. 3 designates the whiffletree.

*t* is a piece of pipe passing loosely through the whiffletree, its ends bearing against the bars A and B, the bolt reaching through the bars and pipe, holding them firmly together and leaving the whiffletree free to turn on the pipe or tube.

Z is the hooked forward ends of the bars D, engaging the staple-bolts G, which reach through the thills and ends of cross-bars, as shown in Fig. 7.

It is designed by us to provide a very strong and serviceable vehicle at the least possible price of construction.

In explanation, it will be seen that by placing the spring back of axle and using the steps for its support and connecting them to the axle by our improved rod thill-fastenings we make this part a very cheap arrangement. Extra clips may be used on the axle inside of thill to strengthen the support to step, if desired; but we do not find it necessary. The braces C C, running at different angles from the spring to under side of seat, make a very strong support for the seat and body of vehicle, and being attached near the center of seat-bars, as shown in Fig. 1, support any weight on the seat directly on the spring, and for this reason lighter bars may be used to form the seat and body than if attached forward of seat. By turning the rear ends of seat-bar up to form the back with the slats we also save expense on the seat and rail.

Our arrangement of the whiffletree between the cross-bars saves time and expense in construction.

By combining the several improvements we have obtained the object designed of producing a good, strong, desirable vehicle at the least possible cost of construction.

Having thus described our invention, what we claim as new and novel, and desire to secure by Letters Patent, is—

1. In a two-wheeled vehicle, the thills attached to the axle at their rear ends and having the cross-bars one above the other at the center and separated by the thills at the ends, with the whiffletree located between and held to its place by the pipe and bolt, as shown, and for the purpose specified.

2. In combination with the thills and axle and body fulcrumed at the forward ends, the braces C C, located one above the other, their ends attached at the same point under seat on each side and running at different angles to the springs in rear of axle, as shown, and for the purpose specified.

3. In combination with the thills and axle of a two-wheeled vehicle, the connecting-rods E, the notched plate $v$, and step S, as shown, and for the purpose specified.

4. In a two-wheeled vehicle, the thills having the cross-bars with whiffletree, located as shown, the body having the hooked forward ends and turned-up rear portion, with the end rail K, the thill-attaching rods E, connecting the thills with axle J, plate $v$, steps S, and brace, the semi-elliptic spring in rear of axle supported by steps S, and the angled braces C C, supporting the body from the spring, all as shown and described.

5. In a two-wheeled vehicle, the frame D for the body and seat with back combined, made in one continuous piece of T-steel or other material, bent in the shape and manner shown, having the forward ends terminate in hooks for fastening to thill or cross-bars, and the rear portion bent up for back of seat and perforated to receive end of seat-rail K, and bolts to slats, constructed, combined, and used substantially in the manner shown and described, and for the purpose specified.

HENRY G. M. HOWARD.
BYRON J. HEALY.

Witnesses:
FRANK HUBBARD,
EDWARD COPE.